Patented Sept. 1, 1942

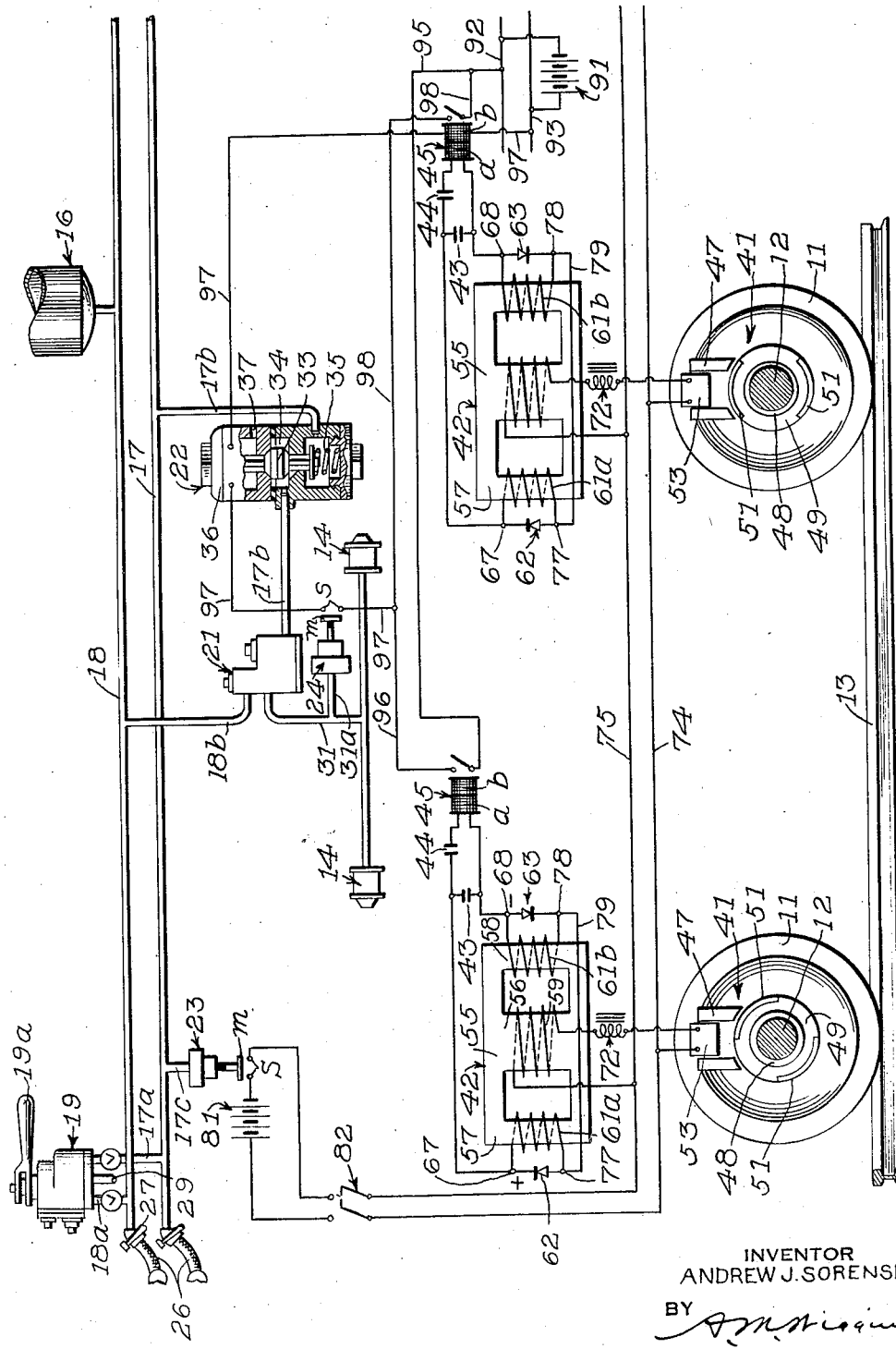

2,294,610

UNITED STATES PATENT OFFICE 2,294,610

BRAKE CONTROL APPARATUS

Andrew J. Sorensen, Edgewood, Pa., assignor to The Westinghouse Air Brake Company, Wilmerding, Pa., a corporation of Pennsylvania Application July 16, 1941, Serial No. 402,606

11 Claims. (Cl. 303—21)

This invention relates to brake control apparatus for vehicles, such as railway cars and trains, and has particular relation to brake control apparatus including means automatically responsive to slipping of the vehicle wheels for effecting instantaneously a rapid release of the brakes to prevent the sliding of the wheels.

As is well known, the application of the brakes to a vehicle wheel to a degree sufficient to exceed the adhesion between the wheel and the rail or road surface causes the wheel to decelerate at an abnormally rapid rate to a locked or non-rotative condition. The dragging of the vehicle wheel in a locked condition along a rail or road surface while the vehicle continues in motion is referred to herein as "sliding" or "a sliding condition" of the wheel.

The term "slipping" or "slipping condition" of a wheel as employed herein is not synonomous with the term "sliding" or "sliding condition" but refers to the rotation of the vehicle wheel at a speed less than that corresponding to vehicle speed at a given instant.

It has been demonstrated that if the degree of application of the brakes associated with a vehicle wheel is rapidly reduced substantially at the instant the wheel begins to slip, the wheel will promptly cease to decelerate and then accelerate back toward a speed corresponding to vehicle speed before reducing sufficiently in speed to attain a locked condition and to slide.

It is desirable to prevent sliding of vehicle wheels, particularly railway car wheels, in order to prevent the development of flat spots on the wheels which require the repair or replacement of the wheels.

Various types of devices both mechanical and electrical have been devised for detecting or registering the slipping condition of a vehicle wheel. One type of such devices is described and claimed in the copending application Serial No. 381,083 of Joseph C. McCune, filed February 28, 1941, now Patent No. 2,283,608 assigned to the assignee of the present application.

In the patent just mentioned, the wheel-slip detecting device is essentially an induction generator comprising a primary winding and a secondary winding carried in mutually inductive relation on a C-shaped magnetic core element having an air gap therein. The magnetic core element is suitably mounted on the vehicle in association with a vehicle wheel or axle so that the reluctance of the flux path in the magnetic core element is alternately increased and decreased in rapid succession repeatedly by means of a plurality of magnetic elements carried by the wheel or axle and rotated past the pole pieces of the magnetic core element in a manner to alternately increase or decrease the reluctance of the air gap between the pole pieces.

The primary winding of the generator is constantly energized by a substantially uniform direct-current and thus, due to the successive alternate increases and decreases of the magnetic flux in the magnetic core, an alternating current is induced in the secondary winding having a frequency and an effective voltage substantially proportional to the rotational speed of the vehicle wheel or axle.

In order to utilize the alternating current voltage produced by the induction generator, a full-wave rectifier is provided and a resistor of relatively high resistance is connected across the output terminals of the rectifier so that a direct-current voltage is impressed thereon which corresponds substantially in value to the speed of rotation of the vehicle wheel. A relay and a condenser are connected in series relation across the resistor in such a manner that the relay is operatively responsive only to a current discharged from the condenser, upon a reduction in the voltage of the resistor exceeding a certain value occurring only when a wheel slips, to initiate a rapid release of the brakes.

It is an object of my invention to provide a brake control equipment similar to that described in the McCune patent but differing therefrom in providing an arrangement including a novel type of rectifier, described and broadly claimed in my copending application Serial No. 402,605, filed concurrently with the present application, which increases the over-all efficiency of utilization of the energy supplied by the induction generator wheel-slip detectors and at the same time effects a reduction in the cost of the apparatus.

More specifically, it is an object of my invention to provide a brake control equipment of the nature indicated in the foregoing object, wherein the novel type of rectifier provided has a low-resistance to current-flow in opposite directions therethrough, thereby enabling the elimination of the high resistance resistor employed previously and a consequent diminution in energy loss necessarily incident to the use of the resistor.

The above objects, and other objects of my invention which will be made apparent hereinafter, are attained by means of an illustrative embodiment of my invention, hereinafter to be described, and shown in the accompanying single-figure drawing.

Description

For simplicity, my invention is shown in connection with only one four-wheel railway car truck having two wheel and axle assemblies, each assembly comprising two wheels 11 fixed to opposite ends of a connecting axle 12 and engaging opposite rails 13 of a track. In the drawing, only one wheel of each assembly is visible.

Any suitable type of brake mechanism for the wheel and axle assemblies may be provided, for example, the conventional clasp shoe type frictionally engaging the rim of the wheels and adapted to be applied and released through the medium of suitable brake levers and brake rigging in response to the supply of fluid under pressure to and the release of fluid under pressure from one or more brake cylinders 14. In the drawing, one brake cylinder 14 is provided for each wheel and axle assembly.

Any suitable type of fluid pressure brake control apparatus may be provided for effecting the supply of fluid under pressure to and the release of fluid under pressure from the brake cylinders 14 under the control of the operator. I have illustrated a simplified form of straight-air brake control comprising a reservoir 16, two train pipes 17 and 18 hereinafter respectively referred to as the control pipe and the supply pipe, a self-lapping type of brake valve 19, a relay valve device 21 for effecting the supply of fluid under pressure to and the release of fluid under pressure from the brake cylinders 14, and a magnet valve device 22 for in part controlling the operation of the relay valve 21. The apparatus also includes two pressure operated switch devices 23 and 24.

The train pipes 17 and 18 extend from end to end of each car and the sections thereof on successive cars are connected through conventional hose couplings 26. Conventional angle cocks 27 may be provided at each end of a car for opening and closing communication through the pipes as desired.

The brake valve 19 is of the self-lapping type shown and claimed in Patent 2,042,112 to Ewing K. Lynn and Rankin J. Bush. Since reference may be had to the patent for a detailed description of the brake valve, it will be described only functionally herein. In the normal or brake release position of the brake valve handle 19a the control pipe 17 is vented to atmosphere under the control of the brake valve by way of a branch pipe 17a and an exhaust port and pipe 29 of the brake valve so that the control pipe is normally at atmospheric pressure. When the brake valve handle is shifted in a horizontal plane, out of the brake release position into a so-called application zone, the brake valve mechanism operates to cause fluid under pressure to be supplied from the supply pipe 18 and connected reservoir 16 through a branch pipe 18a and pipe 17a to the control pipe. The character of the brake valve is such that the pressure established in the control pipe varies in accordance with the degree of displacement of the brake valve handle out of its brake release position. When a pressure corresponding to the position of the brake valve handle is attained in the control pipe, the valve mechanism of the brake valve is automatically self-lapping to cut off the further supply of fluid under pressure to the control pipe.

If the pressure in the control pipe tends to reduce for some reason such as leakage, the brake valve mechanism automatically operates to supply fluid under pressure to the control pipe to maintain a pressure therein corresponding to the position of the brake valve handle. This pressure-maintaining feature of the brake valve will be referred to hereinafter in connection with an assumed operation.

The relay valve device 21 is of the high-capacity supersensitive type described and claimed in Patent 2,096,491 to E. E. Hewitt. Since reference may be had to the patent, it is believed unnecessary to describe the relay valve in detail.

Briefly, the relay valve device comprises supply and release valves operatively controlled by a diaphragm or piston having a control chamber on one side to which fluid under pressure is supplied from control pipe 17 through a branch pipe 17b and having on the other side a chamber which is connected to the brake cylinders 14 through a pipe 31.

When the fluid supplied to the control chamber of the relay valve device from the control pipe 17 is at atmospheric pressure, the supply valve is closed and the release valve is opened to release fluid under pressure from the brake cylinders 14 through an exhaust port not shown. When fluid at a given pressure is supplied to the control chamber of the relay valve device, the release valve is closed and the supply valve is opened to cause fluid under pressure to be supplied from the supply pipe 18 and a branch pipe 18b thereof to the pipe 31 and connected brake cylinders 14. When the pressure in the brake cylinders attains a value substantially equal to, or any desired percentage of, the pressure supplied to the control chamber of the relay valve device, the supply valve is automatically closed while the release valve remains closed. The relay valve 21 accordingly establishes a pressure in the brake cylinders corresponding to that established in the control pipe 17. Moreover, the relay valve 21 is very sensitive to minute variations of pressure in the control pipe and, being of high capacity, is adapted to effect an increase or a reduction of the pressure in the brake cylinders at a rate corresponding substantially to the rate of increase or reduction of the fluid pressure in the control chamber of the relay valve device.

The magnet valve device 22 is of conventional type comprising a double beat valve 33 contained in a chamber 34 and biased normally upwardly to an upper seated position by a coil spring 35 and shifted downwardly to a lower seated position in response to energization of a magnet winding 36.

With the magnet winding 36 deenergized, the double beat valve 33 is effective in its upper seated position to establish communication through the branch pipe 17b from the control pipe 17 to the control chamber of the relay valve device 21. Upon energization of the magnet winding 36 of the magnet valve 22 and consequent actuation of the double beat valve 33 to its lower seated position, communication through the pipe 17b is closed and that section of the pipe 17b connected to the relay valve 21 is connected to atmosphere through an exhaust port 37, thus causing fluid under pressure to be vented from the control chamber of the relay valve 21 at a rapid rate.

The pressure operated switches 23 and 24 are preferably of the snap-acting type described and claimed in Patent 2,096,492 to E. E. Hewitt. As diagrammatically shown, the switches severally comprise a movable contact m and two associated stationary insulated contacts s.

Pressure switch 23 is connected through a branch pipe 17c to the control pipe 17 and when the pressure in the control pipe exceeds a certain pressure, such as five pounds per square inch, the movable contact m is snapped into its closed position engaging the stationary contacts s, where it remains until the pressure in the control pipe reduces below five pounds per square inch when it is snapped to its open position, as shown, out of engagement with the contacts s.

The pressure switch 24 is connected by a branch pipe 31a to the brake cylinder pipe 31 and is thus operatively responsive to variations of the pressure in the brake cylinders 14. When the pressure in the brake cylinders 14 exceeds a value, such as fifteen pounds per square inch, the movable contact m is snapped into its closed position engaging its associated stationary contacts s and remains in engagement therewith until the brake cylinder pressure reduces below fifteen pounds per square inch when it is snapped to its open position, as shown, out of engagement with the contacts s.

According to my invention, I further provide in connection with each wheel and axle assembly an induction generator apparatus 41, a transformer rectifier 42, and in the output circuit of each transformer-rectifier two electrical condensers 43 and 44 and a relay 45. As will be described hereinafter, the relays 45 for the wheel and axle assemblies of a given wheel truck operate severally to control energization and deenergization of the magnet winding of the magnet valve 22.

As diagrammatically shown, the induction generator apparatus associated with each wheel unit comprises a C-shaped magnetic core element 47 suitably carried by the wheel truck in juxtaposition to a wheel 11, on the hub 48 of which is fixed an annular element 49 of non-magnetic material, such as aluminum, which carries a plurality (shown as two) of circumferentially spaced magnetic inserts 51. Although only two magnetic inserts 51 are shown, it will be obvious that any desired number may be provided whereby to bridge the air gap between the two pole pieces of the magnetic core element 47 in rapid succession as the wheel rotates.

Carried on the magnetic core element 47 is a winding 53 which is effective, when energized in the manner presently described, to set up a magnetic flux in the core element 47. It will be apparent that the reluctance of the air gap between the pole pieces of the core element 47 is decreased when a magnetic insert 51 bridges the pole pieces, thereby effecting a maximum flux density in the core element for a given current energizing the winding 53. When the magnetic insert passes away from beneath the pole pieces of the magnetic core element, the reluctance of the air gap between the pole pieces increases the total reluctance of the flux path and the density of the magnetic flux in the core element 47 is thereby correspondingly increased.

It will thus be apparent that upon rotation of a wheel, the alternate increase and decrease in the density of the magnetic flux in the magnetic core element 47 causes an alternating current voltage to be induced in the winding 53. The effective value of the alternating current voltage induced in the winding 53 as well as its frequency will vary substantially in proportion to the rotational speed of the wheel or wheel unit.

The transformer-rectifier 42 associated with each induction generator apparatus 41 comprises a magnetic core element 55 in the shape of a figure 8. In other words, the magnetic core element 55 comprises a central leg 56 connected at top and bottom to two outer legs 57 and 58, disposed respectively on opposite sides thereof. Although shown in a single plane, the legs 57 and 58 may be in different planes or any other equivalent structure may be employed.

The transformer-rectifier further comprises a suitable winding 59 surrounding the central leg 56 and hereinafter designated the primary winding, as well as two secondary windings designated 61a and 61b respectively surrounding the legs 57 and 58 of the magnetic core 55.

As indicated diagrammatically, the secondary windings 61a and 61b have the same number of turns and are so arranged that the upper terminals of the windings are simultaneously of positive polarity or simultaneously of negative polarity during opposite half-portions of the voltage cycle.

An asymmetric device 62, either of the tube or dry-disk type of rectifier is connected in parallel relation with the secondary winding 61a. A similar asymmetric device 63 is connected in parallel with the secondary winding 61b. The connection of the asymmetric devices in shunt relation to the associated windings is such as to cause an appreciable short-circuit current to flow through only the one secondary winding during one half-portion of each induced voltage cycle and through only the other secondary winding during the other half-portion of the same voltage cycle. The reason for this will be made apparent hereinafter.

The upper terminals of the secondary windings 61a and 61b are designated respectively 67 and 68 and hereinafter referred to as the output terminals. The lower terminals of the windings 61a and 61b respectively designated 77 and 78, are connected by a low-resistance wire 79. The windings 61a and 61b are accordingly connected in series opposition to each other and the voltage across the output terminals 67 and 68 would be nil except for the asymmetric devices 62 and 63.

The primary winding 59 of each transformer-rectifier is connected in series relation with the winding 53 of the associated induction generator apparatus 41 and a choke coil 72 across a pair of bus wires 74 and 75, hereinafter respectively referred to as the positive and negative bus wires. The positive and negative bus wires 74 and 75 are connected across the terminals of a suitable source of direct-current, such as a storage battery 81, through a double-pole knife switch 82 (which is normally closed) and by pressure operated switch 23, the contacts of which are interposed in one of the bus wires, for example the negative bus wire 75. It will thus be seen that both the pressure switch 23 and switch 82 must be closed in order to impress the battery voltage on the bus wires 74 and 75.

In order to describe the operation of the transformer-rectifier 42, let it be assumed that the pressure switch 23 and knife switch 82 are both closed so that the winding 53 of the induction generator 41 and the primary winding 59 of the transformer-rectifier are energized by direct-current from the battery 81. Upon rotation of the corresponding wheels, the alternating voltage induced in the generator winding 53 is superimposed on the direct-current voltage supplied from the battery 81 so that the primary winding 59 in series therewith is correspondingly energized by a pulsating direct-current. An alternating-current voltage is accordingly induced in the two secondary windings 61a and 61b, the instantaneous polarity of which is positive at the output terminals 67 and 68 during one half-portion of the voltage cycle and negative during the succeeding half-portion of the same voltage cycle. In other words, the voltages of secondary windings 61a and 61b are constantly in opposition.

When the polarity of the induced voltage in the secondary windings at the output terminals 67 and 68 thereof is positive, the asymmetric device 62 provides a high-resistance shunt path around the winding 61a whereas the asymmetric device 63 provides a low-resistance shunt path around the winding 61b. The short-circuit current flowing in the secondary winding 61a is thus relatively small due to the relatively light load effect of asymmetric device 62 when traversed by current in its high resistance direction, whereas the short-circuit current flowing in the secondary winding 61b is relatively large due to the relatively heavy load effect of asymmetric device 63 when traversed by current in its low resistance direction. Accordingly, the voltage across the terminals of the secondary winding 61a remains relatively high, whereas the voltage across the terminals of the secondary winding 61b is substantially reduced.

Due to the relatively high short-circuit current in the secondary winding 61b compared to that in the winding 61a, a higher reactance flux is set up by the winding 61b than by the winding 61a. Thus the flux density in the leg 58 of the core 55 is decreased and the flux density in the leg 57 is correspondingly increased. Due, therefore, to the greater flux density in the leg 57, the instantaneous voltage induced in the winding 61a, is still further increased relative to that induced in the winding 61b.

It will thus be apparent that with the instantaneously negative terminals 77 and 78 of the two secondary windings connected by the low resistance wire 79, the terminal 67 of the secondary winding 61a has a potential higher than that of the terminal 68 of the winding 61b by an amount corresponding substantially to the difference in the voltage across the terminals 67 and 77 of the secondary winding 61a and the voltage across the terminals 68 and 78 of winding 61b.

During the next half-portion of the same voltage cycle induced in the secondary windings, the polarity of the voltage induced in the windings will be simultaneously negative at the upper terminals thereof. At this time, the asymmetric device 62 provides a low-resistance shunt around the winding 61a whereas the asymmetric device 63 provides a high-resistance shunt path around the winding 61b. A relatively high short-circuit current is accordingly produced in the winding 61a whereas a relatively low short-circuit current is produced in the winding 61b. Due to the relatively higher short-circuit current in the winding 61a compared to that in the winding 61b, the reactance flux induced by the several windings is such as to cause a decrease in the flux density in the left-hand leg 57 of the core 55 and a corresponding increase in the flux density in the right-hand leg 58 of the core. A correspondingly higher voltage is accordingly induced in the secondary winding 61b compared to that induced in the winding 61a.

It will be seen that, at this time, the terminal 67 of the secondary winding 61a is again at a potential higher than that of the terminal 68 of the secondary winding 61b by an amount which corresponds substantially to the difference in the voltage across terminals 68 and 78 of winding 61b and the voltage across terminals 67 and 77 of winding 61a.

It will thus be seen that a direct-current voltage of constant polarity will be produced across the output terminals 67 and 68 of the transformer-rectifier 42. In view of the fact that the output terminal 67 is always at a higher potential than the output terminal 68, the terminal 67 is referred to as the positive output terminal and the terminal 68 is referred to as the negative output terminal.

It will be apparent that the direct-current voltage across the output terminals 67 and 68 of the transformer-rectifier will vary substantially in proportion to the rotational speed of the wheel unit with which the apparatus is associated. This is so because the voltage across the output terminals 67 and 68 varies in proportion to the alternating-current voltage induced in the secondary windings 61a and 61b, which voltage in turn varies directly in accordance with the rate of change of flux density in the core 55. The rate of change of flux density in the core 55 is, in turn, substantially proportional to the rate of change of current in the primary winding 59 which rate of change is, in turn, substantially proportional to the pulsation frequency of the direct-current energizing the winding. The pulsation frequency of the direct-current energizing the winding 59 is directly proportional to the rotational speed of the vehicle wheel unit associated therewith. Thus the voltage across the output terminals 67 and 68 of the transformer-rectifier is substantially proportional to the rotational speed of the wheel unit.

In order to insure more nearly a direct proportionality between the terminal voltage across the output terminals 67 and 68 of the transformer-rectifier 42 with relation to the rotational speed of the vehicle wheel, the choke coil or reactor 72 is provided. By suitably designing the choke coil 72, the current energizing the primary winding may be so automatically controlled, in response to the variation in the impedance or inductive reactance of the choke coil due to variation in the frequency of the alternating current induced in the generator winding 53, that the voltage induced in the secondary windings 61a and 61b varies, as nearly as practicable, in direct proportion to the variation of the rotational speed of the associated wheel unit. Since the voltage across the output terminals 67 and 68 varies directly in proportion to the voltage induced in the secondary windings 61a and 61b, it will be seen that a substantially direct proportionality of the rectifier output voltage with respect to rotational speed of the wheels is thus assured.

The several relays 45 are of a so-called uni-directional type and are identical. Each relay comprises two separate windings designated a and b respectively. When winding a, hereinafter referred to as the pick-up winding, is energized by a current exceeding a certain value and flowing in one certain direction, the single front contact of the relay is actuated from a normally open or dropped-out position to a picked-up or closed position and maintained in its picked-up position only so long as the current in such certain direction exceeds a value somewhat lower than such certain value. Obviously, the current required to maintain a relay picked-up is less than that required to cause pick-up of the relay. If the direction of the current through the pick-up winding $a$ reverses or if the degree of current in the proper direction reduces sufficiently below the said certain value, the single front contact is restored to its dropped-out or open position by biasing means not shown.

According to my invention, the pick-up winding $a$ of each of the relays 45 is connected in series relation with a corresponding condenser 44 across the output terminals 67 and 68 of the corresponding transformer-rectifier 42. Condenser 43 is connected across the output terminals 67 and 68 of each transformer-rectifier and is for the purpose of smoothing out the pulsations in the direct-current voltage produced across the terminals.

The pick-up winding $a$ of each of the relays 45 is so connected that when the voltage across the output terminals 67 and 68 of the associated transformer-rectifier 42 increases, the current supplied to charge the condenser 44 is in a direction which is ineffective to cause pick-up of the contact of the relay. Conversely, the connection of the pick-up winding $a$ of the relay 45 is such that when the voltage across the output terminals 67 and 68 of the associated transformer-rectifier 42 reduces, the current discharged from the condenser 44 flows serially through the pick-up winding $a$ of the relay 45 and the secondary windings 61a and 61b is in the proper direction to cause pick-up of the contact of the relay.

The design of the pick-up winding $a$ of each relay 45 and the capacity of the condenser 44 in series-circuit relation therewith is such that the condenser discharge current occurring in response to the reduction of the voltage across the output terminals 67 and 68 of the associated transformer-rectifier 42 does not exceed a value sufficient to cause actuation of the contact of the relay to its picked-up or closed position unless the voltage across the output terminals 67 and 68 reduces at a rate which occurs only when the corresponding wheel unit slips. In other words, the contact of the relay 45 is not actuated to its picked-up or closed position unless the corresponding wheel unit slips.

It should be here understood that the arrangement including the series-related condenser and relay whereby the relay contact is picked-up only in response to condenser discharge current exceeding a certain value is not in itself my invention.

As previously indicated, the contact of each relay 45 would be restored to its dropped-out or open position whenever the current in the proper direction energizing the pick-up winding $a$ reduces sufficiently below the said certain value occurring when the wheels slip. In order to maintain the contact of the relay 45 picked-up even after the current in the pick-up winding $a$ reduces substantially below the said certain value, I provide an arrangement including the second winding $b$ of one of the relays, shown as the relay 45 associated with the right-hand wheel unit, as a holding or stick winding. The manner in which the holding winding $b$ at the right-hand relay 45 is utilized for this purpose to be explained more fully hereinafter.

Operation

Let it be assumed that the vehicle having the brake control equipment shown in the drawing is traveling under power at a given speed such as fifty miles per hour with the brake valve handle 19a in brake release position so that the brakes are released, and that the operator desires to apply the brakes to bring the car to a stop. In such case, the operator first cuts off the propulsion power by shifting the propulsion controller (not shown) to its power-off position and then shifts the brake valve handle 19a out of its brake release position into its application zone an amount corresponding to the desired degree of application of the brakes.

The control pipe 17 is accordingly charged with fluid at a pressure corresponding to the position of the brake valve handle, for example, forty pounds per square inch. Fluid under pressure is accordingly supplied from the control pipe 17 through the branch pipe 17b to the control chamber of the relay valve device 21 which accordingly operates to cause fluid under pressure to be supplied from the branch pipe 18b of the supply pipe 18 to the brake cylinders 14. When the pressure in the brake cylinders 14 corresponds to or is a certain percentage of that established in the control pipe 17, the supply of fluid under pressure to the brake cylinders is cut off automatically by the self-lapping valve mechanism of the relay valve device 21. The brakes are accordingly applied to the wheels of the car in accordance with the fluid pressure established in the brake cylinders.

As long as the wheels do not slip, no further change of the pressure in the brake cylinders 14 occurs except in response to variation of the pressure in the control pipe by operation of the brake valve 19. Thus, the operator may graduate the application of the brakes on or off as desired by shifting the brake valve handle to a greater or less degree out of the normal brake release position in successive steps. Whenever a change of pressure occurs in the control pipe 17, the relay valve device 21 operates correspondingly to increase or decrease the pressure in the brake cylinders, thereby causing the degree of application of the brakes to correspond to the pressure in the control pipe 17.

If, at the time that an application of the brakes is initiated or at any time during an application of the brakes, the wheels of an individual wheel unit begin to slip, a further operation occurs which will now be described.

Let it be assumed that the wheels 11 of the left-hand wheel unit shown in the drawing begin to slip while the brakes are applied. In view of the fact that the contacts of the pressure operated switch 23 are closed in response to the pressure established in the control pipe 17, the winding 53 of the induction generator apparatus 41 associated with each wheel unit is energized by a substantially constant direct-current supplied from the battery 81. As previously explained, a direct-current voltage corresponding substantially to the rotational speed of the vehicle wheels 11 is thus produced at the output terminals 67 and 68 of each transformer rectifier 42.

Upon the rotative deceleration of the wheels at a slipping rate, that is a rate of deceleration exceeding that corresponding to a rate of retardation of the car of for example ten miles per hour per second, the current discharged from condenser 44 through the pick-up winding $a$ of the relay 45 and secondary windings 61a and 61b in series therewith in response to the rapid reduction of the voltage across the output terminals 67 and 68 of the transformer-rectifier 42 associated with the slipping wheels causes the contact of the relay 45 to be actuated to its picked-up or closed position. The closure of the contact of relay 45 establishes a circuit for energizing the magnet winding 36 of the magnet valve device 22.

It will be noted that the current discharged from condenser 44 by-passes the asymmetric devices 62 and 63 by flowing through the secondary windings 61a and 61b which are of low-resistance. It is unnecessary therefore to provide a resistor external to the output terminals of the rectifier, as previously has been necessary with heretofore known rectifiers, in order to provide a discharge path for the current discharged from the condenser. The energy lost in these external resistors of heretofore known systems is thus avoided by my present system.

If desired, the current for energizing the magnet winding 36 may be supplied from the storage battery 81 if a suitable voltage regulator is employed. However, in the absence of a voltage regulator, it is preferable to supply current from a separate source such as an additional battery 91, the positive and negative terminals of which are connected to positive and negative bus wires 92 and 93 respectively.

The circuit for energizing the magnet winding 36 of the magnet valve device 22 extends from the positive bus wire 92 by way of a wire 95, the contact of the relay 45 associated with the left-hand or slipping wheel unit, a wire 96, a wire 97 including in series relation therein the contacts of the pressure operated switch 24, the magnet winding 36 of the magnet valve 22, and the holding winding b of the relay 45 associated with the right-hand wheel unit to the negative bus wire 93. It will be apparent that the contact of the pressure operated switch 24 is closed because of the pressure existing in the brake cylinders.

Upon the energization of the holding winding of the right-hand relay 45, the contact of this relay is actuated to its picked-up or closed position thereby establishing a connection in parallel with the contact of the left-hand relay 45 between the wire 95 and the wire 97 through a wire 98. It will be apparent, therefore, that the circuit for energizing the magnet winding 36 of the magnet valve device 22 will be maintained through the contact of the right-hand relay 45 independently of whether or not the contact of the left-hand relay 45 returns to its open position.

Upon the energization of the magnet winding 36 of the magnet valve device 22, communication through the branch pipe 17b between the control pipe 17 and the control chamber of the relay valve device 21 is closed and the control chamber of the relay valve device is vented to atmosphere through the exhaust port 37 at a rapid rate.

The relay valve device 21 accordingly operates to effect a correspondingly rapid reduction of the pressure in the brake cylinders by venting fluid under pressure from the brake cylinders to atmosphere through an exhaust port (not visible) in the relay valve device 21.

Because of the instantaneous and rapid deduction of the pressure in the brake cylinders 14, the wheels of the slipping wheel unit cease to decelerate and begin to accelerate back toward a rotational speed corresponding to car speed without actually reducing to a locked or non-rotative condition and sliding.

The duration of the slipping cycle, that is the time elapsing from the instant that the wheels begin to slip until they are fully restored to a rotational speed corresponding to car speed is of the order of one and one-half to two seconds, which time is less than that required ordinarily for the pressure in the brake cylinders 14 to be reduced sufficiently to effect the operation of the contacts of the pressure operated switch 24 to open position. On the assumption previously made that the contacts of the pressure operated switch 24 are operated to their open position in response to the reduction of the pressure in the brake cylinders to below fifteen pounds per square inch, it will be apparent that the slipping wheels are restored fully to car speed before such reduction in brake cylinder pressure occurs.

When the pressure in the brake cylinders 14 reduces sufficiently to cause the contacts of the pressure operated switch 24 to be actuated to their open positions, the circuit including the holding coil of the right-hand relay 45 and the magnet winding 36 of the magnet valve device 22 is interrupted, thereby resulting in the restoration of the contact of the relay to its dropped-out or open position and restoration of the magnet valve 22 to its normal position reestablishing communication through the branch pipe 17b from the control pipe 17 to the control chamber of the relay valve device 21. It will be apparent that the restoration of the contact of the left-hand relay 45 to its dropped-out or open position in response to the decrease in the rotational deceleration of the slipping wheels below a slipping rate does not operate to interrupt the circuit of the magnet winding 36 and of the holding winding of the right-hand relay 45.

Upon restoration of the magnet valve device 22 to its normal position, fluid under pressure is accordingly resupplied from the control pipe 17 to the control chamber of the relay valve device 21. The relay valve device 21 accordingly operates to cause fluid under pressure to be resupplied to the brake cylinders in accordance with the pressure in the control pipe 17. This resupply of fluid under pressure to the control chamber of the relay valve device 21 tends to effect a reduction of the pressure in the control pipe 17. However, due to the pressure-maintaining operation of the brake valve 19, fluid under pressure is supplied to the control pipe 17 to maintain a pressure therein corresponding to the position of the brake valve handle to compensate for the fluid under pressures supplied to the control chamber of the relay valve device 21.

When the pressure in the brake cylinders 14 is again built-up above fifteen pounds per square inch, the contacts of the pressure operated switch 24 are again actuated to their closed position. Such operation is not effective, however, to effect reenergization of the magnet winding 36 of the magnet valve device 22 because the contacts of the two relays 45 are both in dropped-out or open position at this time due to the reduced degree of application of the brakes in effect.

If, after the pressure is sufficiently restored in brake cylinders 14, slipping of the wheels of either of the wheel units again occurs, the above automatic release and reapplication of the brakes is again effected. Repeated cycles of automatic release and reapplication of the brakes on the wheel units of a particular truck may therefore occur during a brake application but at no time are the wheels permitted to decelerate to a locked condition and slide. Even if the wheels did attain a locked condition, such condition would remain for an instant only due to the continuing release of the pressure in the brake cylinders and the consequent continued reduction in the degree of application of the brakes, thereby insuring the restoration of the slipping wheels to a rotational speed corresponding to car speed.

If during a brake application, the wheels of the right-hand wheel unit begin to slip, the contact of the associated relay 45 is actuated to its picked-up position to establish the circuit for energizing the magnet winding 36 of the magnet valve 22 and its own holding winding. Obviously, in such case, the decrease in the rotative deceleration of the slipping wheels below a slipping rate is not effective to restore the contact of the associated relay 45 to its dropped-out position because of the maintenance of energization of the holding winding subject to the opening of the pressure operated switch 24.

It should be understood that the production of a pulsating direct-current in the circuit for energizing the primary winding 59 of any of the transformer-rectifiers 42 at a frequency corresponding to the slipping condition of the corresponding wheel does not affect the primary winding 59 of other transformer-rectifiers connected to the bus wires 74 and 75. This is so because of the low impedance and resistance of the battery 81 connected across the bus wires 74 and 75 relative to the impedance of the individual energizing circuits for the several primary windings 59. Accordingly, each relay 45 will be picked-up individually only in response to the slipping of the corresponding wheel unit and will be unresponsive to the slipping condition of wheel units other than the associated wheel unit, whether on the same truck or on different trucks of the same or other cars.

When the car comes to a complete stop following a brake application, whether or not slipping of the wheels occurred during the brake application, the contacts of the relays 45 are always restored to their dropped-out or open positions and the magnet valve device 22 is accordingly always restored to its normal condition. Thus, when the car comes to a complete stop, the brakes are always applied in accordance with the fluid pressure established in the control pipe 17. Obviously, after the car has completely stopped, the operator may increase the pressure in the control pipe as desired to effect a corresponding increase in the degree of application of the brakes for any desired reason such as to hold the car on a grade. With the car stopped, no operation of the wheel-slip detecting relays 45 can occur because no slipping of the wheels can occur. The brakes accordingly remain applied in accordance with the pressure established in the control pipe until such time as they are released by the operator.

Release of the brakes may be effected merely by restoring the brake valve handle 19a to its brake release position to restore the pressure in the control pipe 17 to atmospheric pressure. The relay valve device 21 then operates correspondingly to vent fluid under pressure from the brake cylinders 14 to effect a complete release of the brakes.

The reduction of the pressure in the brake cylinders to below fifteen pounds per square inch restores the contacts of the pressure operated switch 24 to open position. The reduction of the pressure in the control pipe 17 to atmospheric pressure causes operation of the contacts of the pressure operated switch 23 to open position, thereby disconnecting the battery 81 from the positive and negative bus wires 74 and 75 and effecting deenergization of the windings 53 of the induction generators associated with the several wheels or wheel units as well as the primary windings 59 of the several transformer-rectifiers. The drainage of current from the battery 81 is thus avoided except during a brake application.

In the application of the brake control equipment to a train of cars, it will be apparent that the battery bus wires 74 and 75 may be extended from car to car through suitable flexible cable couplings between the cars so that the induction generator windings 53 and the windings 59 of the transformer-rectifiers on all the cars may be energized from a single source, namely the battery 81. If desired, however, each individual car may be provided with a separate pressure operated switch 23 and battery 81 corresponding to that shown, thereby avoiding the necessity of flexible cable connectors between the cars.

In a similar manner, the battery bus wires 92 and 93 may be extended from car throughout the train or each car may be provided with a separate battery corresponding to the battery 91.

In general, it may be said that the equipment shown is duplicated for each wheel truck. Thus, while the application and the release of the brakes on all the cars throughout the train are under the control of the operator, the brakes on individual wheel trucks are automatically controlled in response to slipping of the wheels thereon independently of the brakes on other trucks.

The subject matter of invention which I claim in the present application relates to the brake control system as a whole, the novel features of the transformer-rectifier employed in the system being separately and broadly claimed in my copending application Serial No. 402,605 referred to above.

Having now described my invention, what I claim as new and desire to secure by Letters Patent, is:

1. In a vehicle brake control equipment of the type in which the brakes associated with the vehicle wheels are applied and released under the control of the operator, the combination of an induction generator associated with a wheel of the vehicle and adapted to supply an alternating voltage varying in frequency and amplitude substantially in proportion to the rotational speed of the wheel, a transformer device having a primary winding energized by the alternating voltage supplied by the induction generator and two secondary windings inductively related to the primary winding and in which substantially equal voltages are induced, a first asymmetric device connected in shunt relation to one of said secondary windings to provide a low-resistance short-circuit path therearound only during one half-portion of a given alternating-current voltage cycle, a second asymmetric device arranged in shunt relation to the other of said secondary windings to provide a low-resistance short circuit path therearound only during the other half-portion of said given alternating-current voltage cycle, said secondary windings being so connected in opposition and the arrangement being such that a potential difference of constant polarity is established across one terminal of said one secondary winding and the corresponding terminal of the said other secondary winding which potential difference varies substantially in proportion to variation in the rotational speed of the vehicle wheel, and means controlled in response to variation of the potential difference across the said terminals of the said secondary windings for controlling the degree of application of the brakes associated with the vehicle wheel.

2. In a vehicle brake control equipment of the type in which the brakes associated with the vehicle wheels are applied and released under the control of the operator, the combination of means for supplying an alternating voltage having an amplitude of variation and a variation frequency substantially proportional to the rotational speed of a wheel of the vehicle, a transformer device having a primary winding which is energized by the alternating voltage supplied by the last said means and two secondary windings inductively related to the primary winding, said secondary windings having substantially equal voltages induced therein and so connected that the voltages are in opposition, a first asymmetric device so connected as to provide a low-resistance short-circuit path around one of said secondary windings only during one half-portion of a given alternating-current voltage cycle, a second asymmetric device so connected as to provide a low-resistance short-circuit path around the other of said secondary windings only during the other half-portion of said given alternating-current voltage cycle, the arrangement being such that a potential difference of constant polarity is established across one terminal of said one secondary winding and the corresponding terminal of the said other secondary winding which potential difference varies substantially in proportion to variations in the rotational speed of the vehicle wheel, and means controlled in response to variations of such potential difference across the said terminals of the secondary windings for controlling the degree of application of the brakes associated with said wheel.

3. In a vehicle brake control equipment of the type in which the brakes associated with the vehicle wheels are applied and released under the control of the operator, the combination of means for supplying a voltage repeatedly increasing and decreasing alternately at a frequency substantially proportional to the rotational speed of a wheel of the vehicle and having an amplitude of variation also substantially proportional to the rotational speed of a wheel of the vehicle, a device comprising two inductive windings and means energized by the alternately increasing and decreasing voltage whereby to cause an alternating current to be induced in said windings, said windings being such that substantially equal voltages are induced therein and being so connected that the voltages are in opposition to each other, a first asymmetric device arranged to provide a low-resistance shunt around one of said windings during one half-portion of the alternating-current voltage cycle and a high-resistance shunt thereon during the other half-portion of the same voltage cycle, a second asymmetric device so arranged as to provide a high-resistant shunt around the other of said windings during the said one half-portion of the alternating-current voltage cycle and a low-resistance shunt during the said other half-portion of the alternating-current voltage cycle, the arrangement being such that a potential difference of constant polarity occurs between one terminal of one winding and the corresponding terminal of the other winding which potential difference varies with variations in the rotational speed of the vehicle wheel, and means controlled in response to variation of the potential difference across the said terminals of the windings for controlling the degree of application of the brakes associated with said vehicle wheel.

4. In a vehicle brake control equipment of the type in which the brakes associated with the vehicle wheels are applied and released under the control of the operator, the combination of means for supplying a voltage repeatedly increasing and decreasing alternately at a frequency substantially proportional to the rotational speed of a wheel of the vehicle and having an amplitude of variations also substantially proportional to the rotational speed of a wheel of the vehicle, a device comprising two inductive windings and means energized by the alternately increasing and decreasing voltage whereby to cause an alternating current to be induced in said windings, said windings being such that substantially equal voltages are induced therein and being so connected that the voltages are in opposition to each other, a first asymmetric device arranged to provide a low-resistance shunt around one of said windings during one half-portion of the alternating-current voltage cycle and a high-resistance shunt thereon during the other half-portion of the same voltage cycle, a second asymmetric device so arranged as to provide a high-resistance shunt around the other of said windings during the said one half-portion of the alternating-current voltage cycle and a low-resistance shunt during the said other half-portion of the alternating-current voltage cycle, the arrangement being such that a potential difference of constant polarity occurs between one terminal of one winding and the corresponding terminal of the other winding which potential difference varies with variations in the rotational speed of the vehicle wheel and means operatively responsive only to a reduction of the potential difference across the said terminals of the two windings at a rate exceeding a certain rate for initiating a reduction in the degree of application of the brakes associated with said wheel during a brake application.

5. In a vehicle brake control equipment of the type in which the brakes associated with the vehicle wheels are applied and released under the control of the operator, the combination of means for supplying a voltage repeatedly increasing and decreasing alternately at a frequency substantially proportional to the rotational speed of a wheel of the vehicle and having an amplitude of variations also substantially proportional to the rotational speed of a wheel of the vehicle, a device comprising two inductive windings and means energized by the alternately increasing and decreasing voltage whereby to cause an alternating current to be induced in said windings, said windings being such that substantially equal voltages are induced therein and being so connected that the voltages are in opposition to each other, a first asymmetric device arranged to provide a low-resistance shunt around one of said windings during one half-portion of the alternating-current voltage cycle and a high-resistance shunt thereon during the other half-portion of the same voltage cycle, a second asymmetric device so arranged as to provide a high-resistance shunt around the other of said windings during the said one half-portion of the alternating-current voltage cycle and a low-resistance shunt during the said other half-portion of the alternating-current voltage cycle, the arrangement being such that a potential difference of constant polarity occurs between one terminal of one winding and the corresponding terminal of the other winding which potential difference varies with variations in the rotational speed of the vehicle wheel, means operatively responsive only to a reduction of the potential difference across the said terminals of the two windings at a rate exceeding a certain rate for initiating a reduction in the degree of application of the brakes associated with said wheel during a brake application, and means effective to cause the reduction in the degree of application of the brakes associated with said wheels to below a certain degree, once the reduction is initiated in response to the operation of the last said means, before permitting reapplication of the brakes.

6. In a vehicle brake control equipment of the type in which the brakes associated with the vehicle wheels are applied and released under the control of the operator, the combination of means for supplying a voltage which alternately increases and decreases at a frequency substantially proportional to the rotational speed of a wheel of the vehicle and which has an amplitude of variation also substantially proportional to the rotational speed of the wheel, a transformer device comprising a primary winding energized by the alternately increasing and decreasing voltage and two secondary windings inductively related to the primary winding and wherein substantially equal alternating current voltages are induced, one terminal of one secondary winding being constantly connected to the corresponding terminal of the other secondary winding and the windings being so arranged that the voltages induced therein are in opposition, a first asymmetric device arranged in a manner to provide a low-resistance shunt around the one of said secondary windings during one half-portion of an alternating-current voltage cycle and a high-resistance shunt around the winding during the other half-portion of the voltage cycle, a second asymmetric device so arranged as to provide a high-resistance shunt around the other of said secondary windings during the said one half-portion of the alternating-current voltage cycle and a low-resistance shunt around the winding during the said other half-portion of the alternating-current voltage cycle, the arrangement being such that a potential difference of constant polarity is established between the other terminal of the said one secondary winding and the corresponding terminal of the said other secondary winding, which potential difference varies with variations in the rotational speed of the vehicle wheel, and means controlled in response to variations of the potential between the said terminals of the secondary windings for controlling the degree of application of the brakes associated with the vehicle wheel.

7. In a vehicle brake control equipment of the type in which the brakes associated with the vehicle wheels are applied and released under the control of the operator, the combination of means for supplying a voltage which alternately increases and decreases at a frequency substantially proportional to the rotational speed of a wheel of the vehicle and which has an amplitude of variation also substantially proportional to the rotational speed of the wheel, a transformer device comprising a primary winding energized by the alternately increasing and decreasing voltage and two secondary windings inductively related to the primary winding and wherein substantially equal alternating current voltages are induced, one terminal of one secondary winding being constantly connected to the corresponding terminal of the other secondary winding and the windings being so arranged that the voltages induced therein are in opposition, a first asymmetric device arranged in a manner to provide a low-resistance shunt around the one of said secondary windings during one half-portion of an alternating-current voltage cycle and a high-resistance shunt around the winding during the other half-portion of the voltage cycle, a second asymmetric device so arranged as to provide a high-resistance shunt around the other of said secondary windings during the said one half-portion of the alternating-current voltage cycle and a low-resistance shunt around the winding during the said other half-portion of the alternating-current voltage cycle, the arrangement being such that a potential difference of constant polarity is established between the other terminal of the said one secondary winding and the corresponding terminal of the said other secondary winding, which potential difference varies with variations in the rotational speed of the vehicle wheel, and means operatively responsive only to a reduction of the potential difference between the said terminals of the secondary windings at a rate exceeding a certain rate for initiating a reduction in the degree of application of the brakes associated with the said wheel during a brake application.

8. In a vehicle brake control equipment of the type in which the brakes associated with the wheels of the vehicle are applied and released under the control of the operator, the combination of an inductive winding having a magnetic core element associated therewith which element has two pole-pieces separated by an air gap, magnetic means rotatable according to the rotational speed of a vehicle wheel and cooperating with the air gap of the core element for alternately increasing and decreasing the reluctance of the flux path through said magnetic element at a frequency proportional to the rotational speed of the vehicle wheel whereby to cause an alternating voltage to be induced in said winding, the amplitude and frequency of variation of which are substantially proportional to the rotational speed of the vehicle wheel, a transformer device comprising a primary winding in which a current alternately increasing and decreasing in accordance with the increase and decrease of the voltage induced in said winding is caused to flow, two secondary windings inductively related to the primary winding and adapted to have substantially equal alternating-current voltages induced therein, one terminal of one of said secondary windings and the corresponding terminal of the other of said secondary windings being constantly connected through a low-resistance element and the windings so arranged that the voltages induced therein are in opposition, a first asymmetric device so arranged as to provide a low-resistance shunt around one of said secondary windings during one half-portion of the alternating-current voltage cycle and a high-resistance shunt around said winding during the other half-portion of the same voltage cycle, a second asymmetric device so arranged as to provide a high-resistance shunt around the other of said secondary winding during said one half-portion of the alternating-current voltage cycle and a low-resistance shunt around the winding during the other half-portion of the voltage cycle, the other terminal of the said one secondary winding and the corresponding terminal of the other secondary winding having a potential difference of constant polarity produced there-across which varies substantially in accordance with the variations in the rotational speed of the vehicle wheel, and means controlled in response to the variation of the potential difference across the said terminals of the said winding for controlling the degree of application of the brakes associated with said wheel.

9. In a vehicle brake control equipment of the type in which the brakes associated with the vehicle wheels are applied and released under the control of the operator, the combination of a winding, a magnetic core element associated therewith providing a continuous flux path including an air gap, means including a plurality of magnetic elements rotatable according to the speed of rotation of the vehicle wheel and adapted to repeatedly increase and decrease the reluctance of the air gap in the said magnetic element at a frequency proportional to the rotational speed of the wheel whereby alternate increases and decreases in the density of the magnetic flux in the magnetic core element are produced, means for energizing said winding by substantially constant direct-current voltage for producing a magnetic flux in said magnetic core element, said winding having an alternating voltage induced therein which produces a pulsating direct-current voltage in the said winding, a transformer device having a primary winding energized by the pulsating current flowing through said winding and two secondary windings inductively related to the primary winding in which secondary windings substantially equal alternating-current voltages are induced, one terminal of one secondary winding being constantly connected to the corresponding terminal of the other secondary winding and the windings being so arranged that the voltages produced therein are in opposition, a first asymmetric device so arranged as to provide a low-resistance shunt around said one secondary winding during one half-portion of an alternating-current voltage cycle and a high-resistance shunt during the other half-portion of the same voltage cycle, a second asymmetric device so arranged as to provide a high-resistance shunt around the other of said secondary windings during the said one half-portion of the voltage cycle and a low-resistance shunt around the winding during the other half-portion of the voltage cycle, the arrangement of said secondary windings and asymmetric devices being such that a potential difference of constant polarity is established between the remaining terminal of the said one secondary winding and the corresponding terminal of the other secondary winding, which potential difference varies with variation in the rotational speed of the vehicle wheel, and means operatively responsive only to a reduction of the potential difference across the said terminals of the secondary winding at a rate occurring only when the wheel slips for initiating a reduction in the degree of application of the brakes associated with the corresponding vehicle wheel.

10. In a vehicle brake control system of the type in which the brakes associated with the wheels of the vehicle are applied and released under the control of the operator, the combination of a pair of bus wires on which a direct-current voltage is impressed during a brake application, a plurality of induction generators each generator being associated with a corresponding different wheel unit and having a winding in which an alternating voltage is induced having a frequency and amplitude of variation substantially proportional to the rotational speed of the corresponding wheel, a plurality of transformer devices each associated with a corresponding wheel, each transformer having a primary winding connected in series relation with the said winding of the induction generator for the corresponding wheel across said wires whereby said primary winding is energized by a pulsating direct-current corresponding to that flowing through the winding of the induction generator, and two secondary windings inductively related to the primary winding, one terminal of one secondary winding and the corresponding terminal of the other secondary winding being constantly connected and the windings so constructed and arranged that the inducted voltages are substantially equal and in opposition, a first asymmetric device so arranged in shunt relation to one secondary winding of each transformer as to provide a low-resistance path in one direction and a high-resistance path in the opposite direction, a second asymmetric device in shunt relation to the other of said secondary windings of each transformer so arranged as to provide a low-resistance path in one direction and the high-resistance path in the opposite direction, said asymmetric devices being arranged to effect short-circuiting of the associated secondary windings alternately during successive half-wave portions of a given voltage cycle, the arrangement of said secondary windings and asymmetric devices of each transformer being such that a potential difference of constant polarity is established across the remaining terminals of the two secondary windings which varies substantially in accordance with variations in the rotational speed of the corresponding wheel, and means operative only when the potential difference across the remaining terminals of the secondary windings of any of the several transformers reduces at a rate exceeding a certain rate for initiating a reduction in the degree of application of the brakes associated with all of said wheels.

11. In a vehicle brake control equipment of the type in which the brakes associated with the vehicle wheels are applied and released under the control of the operator, the combination of a source of substantially constant direct-current voltage, an induction generator associated with a wheel of the vehicle and having a winding in which an alternating voltage is induced varying in amplitude and frequency substantially proportionally to the rotational speed of the wheel, a transformer device having a primary winding and two secondary windings inductively related thereto, a reactance coil, the winding of the induction generator, the primary winding of the transformer device, and the said reactance coil being connected in series relation and subject to the voltage of said source, one terminal of one secondary winding and the corresponding terminal of the other secondary winding being constantly connected and the two windings both so constructed and arranged as to have substantially equal opposing voltages produced therein upon rotation of the vehicle wheel which voltages vary in frequency and effective value according to the rotational speed of the wheel, a first asymmetric device connected in shunt relation to one of said secondary windings to provide a low-resistance short-circuit path therearound only during one half-portion of a given alternating-current voltage cycle, a second asymmetric device so arranged in shunt relation to the other of said secondary windings as to provide a low-resistance short-circuit path therearound only during the other half-portion of the said given alternating-current voltage cycle, the arrangement being such that a potential difference of constant polarity is established across the remaining terminals of the two secondary windings which potential difference varies substantially in proportion to variations in the rotational speed of the vehicle wheel, and means operatively responsive only to a reduction in the potential difference across the terminals of the said secondary winding at a rate exceeding a certain rate for initiating a reduction in the degree of application of the brakes associated with said wheel.

ANDREW J. SORENSEN.